United States Patent [19]
Parker

[11] 3,879,331
[45] Apr. 22, 1975

[54] POLYBUTADIENE COATING COMPOSITIONS

[75] Inventor: David J. Parker, Drexel Hill, Pa.

[73] Assignee: E. I. du Pont de Nemours and Company, Wilmington, Del.

[22] Filed: June 19, 1974

[21] Appl. No.: 481,378

Related U.S. Application Data

[63] Continuation-in-part of Ser. Nos. 233,752, March 10, 1972, abandoned, and Ser. No. 374,568, June 28, 1973, abandoned.

[52] U.S. Cl. ....... 260/33.6 A; 117/132 CB; 220/64; 260/91.1 M; 260/889
[51] Int. Cl. .... B65d 23/02; C08c 11/22; C08f 3/34
[58] Field of Search...260/33.6 A, 33.6 AQ, 91.1 M, 260/889; 117/132 CB; 220/64

[56] References Cited
UNITED STATES PATENTS

| | | | |
|---|---|---|---|
| 2,061,934 | 11/1936 | Mueller-Cunradi et al.... | 260/88.1 R |
| 2,697,084 | 12/1954 | Eger............................ | 260/91.1 M |
| 3,107,232 | 10/1963 | Matlack ....................... | 260/91.1 M |
| 3,546,146 | 12/1970 | Sockloff et al.................. | 260/17 |

OTHER PUBLICATIONS

Encyclopedia of Pol. Sci. & Techn. (Vol. 14), pages 517–519, (Interscience), (N.Y.), (1971). TP156.P6.E6.

*Primary Examiner*—Donald E. Czaja
*Assistant Examiner*—H. H. Fletcher

[57] ABSTRACT

Can-coating and lubricant compositions containing a polybutadiene, polyethylene, a polyvinylalkyl ether and an organic liquid carrier.

7 Claims, No Drawings

POLYBUTADIENE COATING COMPOSITIONS

CROSS-REFERENCE TO RELATED APPLICATIONS

This is a continuation-in-part of applications Ser. No. 233,752, filed Mar. 10, 1972, now abandoned, and Ser. No. 374,568, filed June 28, 1973, now abandoned.

BACKGROUND OF THE INVENTION

This invention relates to can-coating compositions. It is more particularly directed to can-coating compositions containing a polybutadiene, polyethylene, a polyvinylalkyl ether and organic liquid carrier.

For many years past, compositions containing polybutadienes have been used to coat the interiors of cans, especially beverage cans. It has been common practice to include a polyethylene lubricant in these compositions to prevent marring scratching of the final finish, and to also include silicone flow agents.

It also has been common practice, when using such compositions, not to coat the cans themselves but to coat one side of the sheet steel before it is formed into a can. After these sheets are coated, they are baked in an oven and then stacked one on the other, coating side up. The pressure in such a stack sometimes causes one or more of the ingredients of the composition to transfer from the coated side of one sheet to the uncoated side of the sheet directly above it. This transfer or "offsetting" may cause mottling and eyeholing of a finsh subsequently applied to the uncoated side of the sheet.

I have found that this transfer or offsetting can be significantly reduced if the silicone flow agent is removed from the composition, either partially or entirely, and replaced with a polyvinylalkyl ether.

SUMMARY OF THE INVENTION

My invention can take two forms — a lubricant concentrate, which can be added directly to a polybutadiene coating composition, or a coating composition, suitable for direct use in coating cans.

The compositions contain identical ingredients — the basic difference between them is in the concentration of these ingredients.

The Polybutadiene

The polybutadiene I use in my compositions can be any of those ordinarily used in can-coating compositions. I find polybutadiene predominantly in the trans 1,4 configuration to be best.

The polybutadiene content of my lubricant compositions can range from 10 through about 90 percent, by weight of the total solids. Preferably, these compositions contain from about 40 to about 45 percent of polybutadiene, by weight of total solids, even more preferably 41 or 42 percent.

My coating compositions, of course, contain more of the polybutadiene component; the content of these compositions ordinarily ranges from about 98 to about 99.8 percent, preferably about 99.5 percent.

The Polyethylene

The polyethylene in my compositions can be any of those commercially used as a lubricant in polybutadiene coating compositions. I have found "Epolene N-10", a polyethylene sold by the Eastman Kodak Company to be satisfactory, although other polyethylenes similar to this should prove equally satisfactory.

The particle size of the polyethylene I use is dictated by the thickness of the final film of the composition. I have found that if the diameter of the polyethylene particle is greater than the thickness of the final film, film quality is impaired. In ordinary situations such films seldom exceed about 0.5 mil in thickness, and particles are therefore seldom larger in diameter than this. Larger particles can of course be used if one is willing to accept lower film quality.

The lower limit on the size of the polyethylene particles appears to be a question of how small they can be made, for even particles in the colloidal size range appear to work satisfactorily.

My lubricant compositions will usually contain from about 10 through about 80 percent, by weight of total solids, of polyethylene. My preferred lubricant compositions will contain from about 55 through about 60 percent, by weight of total solids, of polyethylene, preferably 57 or 58 percent.

My coating compositions will in the ordinary case contain from about 0.4 through about 2 percent, by weight of total solids, of polyethylene, preferably about 0.5 percent.

The Polyvinyl Ethers

The polyvinyl ethers I use in my compositions are any of those having recurring units of the structure

where
R is a branched alkyl radical of from about 3 through about 10 carbon atoms.

The polyvinyl ethers I prefer to use have molecular weights of from about 10,000 through about 25,000. I especially prefer those with molecular wieghts of from about 20,000 through about 25,000. The ethers I prefer most of all have molecular weights of about 25,000. Such a product is sold by Badische and Soda Fabrik, AG, as "Lutonal J-30." In this product, the alkyl group is isobutyl.

A more detailed description of these polyvinyl ethers is found in U.S. Pat. No. 3,546,146 to Sockloff and Singer. This patent describes how the polyvinyl ethers are prepared, where they can be obtained and how their molecular weights are determined. I therefore incorporate the pertinent disclosures of that patent into this application by reference.

In my lubricant compositions and my coating compositions I use an effective amount of a polyvinylalkyl ether, that is, I use enough to make the polybutadiene and polyethylene compatible with one another. The exact amount varies with the level of polybutadiene and polyethylene in the composition. In the usual case, my lubricant compositions contain from about 0.025 through about 2 percent, by weight of total solids, of the ether, preferably about 1 percent. My coating compositions normally contain from about 0.005 through about 0.2 percent, by weight of total solids, of the ether, preferably about 0.01 percent.

The Carrier

The carrier I use in my compositions can be any organic liquid which serves as a solvent for the polybutadiene and the polyvinyllkyl ether, and which doesn't interfere with the physical or chemical characteristics of the composition.

These organic liquids are ordinarily aliphatic hydrocarbons such as mineral spirits, aromatic hydrocarbons such as xylene or toluene, or mixtures of aliphatic and aromatic hydrocarbons.

In my lubricant and coating compositions I use enough of the organic liquid carrier to make the composition workable for the use intended. Ordinarily, my lubricant composition contains from about 50 through about 65 percent, by weight of the total composition, of carrier. My better lubricant compositions contain from about 75 through about 85 percent of carrier, preferably from about 78 through about 80 percent.

My coating compositions, in the usual case, contain from about 30 through about 80 percent, by weight of the total composition, preferably from about 46 through about 48 percent, of carrier.

My lubricant compositions usually contain from about 35 through about 50 percent, by weight, of solids, preferably 15–25 percent, even more preferably about 20–22 percent. They are normally liquid.

My coating compositions will contain from about 20–70 percent, by weight, of solids, preferably about 52–54 percent.

The concentration of carrier and solids in my coating compositions can of course be varied up or down, according to need, before the final coating operation. The ultimate concentration and how to achieve it can be easily worked out by one skilled in this art.

How the Compositions Are Made and Used

I make my lubricant compositions by first adding enough polyethylene to the organic liquid to be used in the coating composition, to make a slurry containing about 20 percent, by weight, of polyethylene. I then heat this slurry to no more than about 100°C., while stirring, to form a thick viscous dispersion.

More organic liquid is then added to this dispersion to form one containing about 15 percent, by weight, of solids, and this is then milled, preferably in a pebble mill, for about 8 hours. A small amount of isopropanol may be added at this stage to minimize fire and explosion hazards.

The resulting polyethylene dispersion, whose particles are now in the proper size range, is then placed in a mixer, the requisite amounts of polybutadiene and polyvinylalkyl ether are added as a solution, and the whole is adjusted to about 15–50 percent, by weight, of solids with the organic liquid. This is then mixed for about 2 hours and preparation of my lubricant composition is then complete.

I prepare my coating compositions by simply adding enough of my lubricant composition to the polybutadiene can-coating composition to give about 3 ounces per gallon of lubricant composition. The composition is mixed thoroughly and is then ready for use.

My coating compositions can be sprayed, dipped or roll-coated to tin plated- or tin-free steel. They are ordinarily applied to give a final dry film about 0.1 to 0.2 mils thick. After the compositions are applied to the steel, it is baked at from 385°F. to about 425°F. for from 6 to about 12 minutes.

DESCRIPTION OF THE PREFERRED EMBODIMENTS

I offer the following examples so that those skilled in the art may practice my invention more easily. I have no doubt that they will be able to compose many variations on my theme, such as the addition of various adjuvants, the addition of ingredients at concentrations above or below my recommended levels, and the use of polyvinyl ethers differ chemically from those I recommend. I consider all of these variations within my inventive concept.

EXAMPLE 1

A. Into a mixer containing

| | |
|---|---|
| Xylol | 26 parts |
| Mineral spirits | 54 parts | were added over a 2 to 2½ hour period, with mixing, 20 parts of "Epolene N-10."

This mixture was then heated to 100°C. and mixed for another 2 hours.

B. Into a porcelain lined pebble mill containing glass beads were charged 71.06 parts of (A), 7.7 parts of xylol, 11.24 parts of mineral spirits and 5 parts of isopropanol. This mixture was then ground for 10 hours under a nitrogen atmosphere, taking care that the temperature was kept below about 120°C.

C. Into another mixer were charged 45 parts of mineral spirits, 0.45 parts of xylol and 10 parts of Lutanol J-30. This was then mixed for 45 minutes at room temperature.

D. 561.3 parts of (B), 103.65 parts of polybutadiene (57 percent solids in mineral spirits), 11.43 parts of (C) and 12.62 parts of mineral spirits were placed in a vessel and mixed for 2.5 hours.

EXAMPLE 2

Into a large mixer were placed 128 parts of "Budium" polybutadiene can coating[1] and 3 parts of the lubricant composition prepared in Example 1. This was mixed for ½ hour.

([1] Sold by E.I. duPont deNemours and Company)

This composition was roll-coated on a sheet of tin-plated steel to give a film about 0.1 to 0.2 mils thick (dry). The steel sheet was then baked for 10 minutes at 405°F.

The steel coated in this fashion could be stacked, removed from the stack and then coated on the uncoated side to give a finish free of mottling and eyeholing.

I claim:

1. In a lubricant concentrate comprising
   A. particulate polyethylene;
   B. a polybutadiene; and
   C. an organic liquid carrier which is a solvent for (B);
the improvement consisting essentially of the presence in said concentrate of from about 0.025 through about 2 percent, by weight of the total solids in the concentrate, of a polyvinyl ether having recurring units of the structure

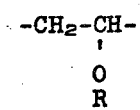

where

R is a branched alkyl radical of 3 through 10 carbon atoms, and having a molecular weight of from about 10,000 through about 25,000.

2. The concentrate of claim 1 wherein the polyvinyl ether has a molecular weight of from about 20,000 through about 25,000.

3. The concentrate of claim 2 wherein the R substituent of the polyvinyl ether is isobutyl and the ester has a molecular weight of about 25,000.

4. In a liquid coating composition comprising
   A. particulate polyethylene;
   B. a polybutadiene; and
   C. an organic liquid carrier which is a solvent for (B); the improvement consisting essentially of the presence in said composition of from about 0.005 through about 0.2 percent, by weight of the total solids in the composition of a polyvinyl ether having recurring units of the structure

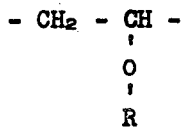

where
   R is a branched alkyl radical of 3 through 10 carbon atoms,
and having a molecular weight of from about 10,000 through about 25,000.

5. The composition of claim 4 wherein the polyvinyl ether has a molecular weight of about 20,000 through about 25,000.

6. The composition of claim 5 wherein the R substituent of the polyvinyl ether is isobutyl and the ether has a molecular weight of about 25,000.

7. The composition of claim 6 wherein the polybutadiene is predominantly trans 1,4-polybutadiene.

* * * * *